United States Patent
Schmid et al.

[11] Patent Number: 5,275,072
[45] Date of Patent: Jan. 4, 1994

[54] CENTER DRIVE SUPPORT FOR SUPPORTING A CRANK SHAFT DURING MACHINING

[75] Inventors: Karlheinz Schmid, Nürtingen; Heinrich Bonfert, Dettingen; Werner Ott, Hülben; Bernd Faigle, Engstingen, all of Fed. Rep. of Germany

[73] Assignee: Gebr. Heller Maschinenfabrik GmbH, Nürtingen, Fed. Rep. of Germany

[21] Appl. No.: 979,294

[22] Filed: Nov. 20, 1992

[30] Foreign Application Priority Data

Nov. 20, 1991 [DE] Fed. Rep. of Germany ....... 4138134

[51] Int. Cl.⁵ .............................................. B23B 5/22
[52] U.S. Cl. .......................................... 82/164; 82/106
[58] Field of Search ................ 82/106, 150, 162, 164, 82/165, 167, 903

[56] References Cited

U.S. PATENT DOCUMENTS

| | | | |
|---|---|---|---|
| 3,621,740 | 11/1971 | Thomas | 82/162 |
| 3,815,929 | 6/1974 | Steinberger et al. | 82/165 |
| 4,558,978 | 12/1985 | Berbalk | 82/164 |
| 4,693,147 | 9/1987 | Shackelton | 82/165 |
| 4,819,527 | 4/1989 | Redman | 82/165 |

FOREIGN PATENT DOCUMENTS 0264476 10/1986 European Pat. Off. .
3101924 1/1981 Fed. Rep. of Germany .

*Primary Examiner*—William E. Terrell
*Attorney, Agent, or Firm*—Robert W. Becker & Associates

[57] ABSTRACT

A center drive support for supporting a crankshaft during machining in a machining device comprises a rotatably drivable support member and a drive unit. The rotatably drivable support member has a carrier with at least two clamping elements with clamping ends. The clamping elements are displaceable between a clamping position and a release position for the crankshaft. The clamping elements clamp the crankshaft between their clamping ends. The drive unit is connected to the clamping elements for applying a required clamping force in the clamping position during rotation of the support member. The drive unit includes a clamping motor and a drive shaft connected to the clamping motor. It further includes a gear unit connected between the drive shaft and the carrier. The gear unit, during machining of the crankshaft in the clamping position, follows the rotation of the support member against the toque of the clamping motor.

13 Claims, 4 Drawing Sheets

CENTER DRIVE SUPPORT FOR SUPPORTING A CRANK SHAFT DURING MACHINING

BACKGROUND OF THE INVENTION

The present invention relates to a center drive support for supporting a crankshaft during machining, the center drive support comprising a rotatably drivable support member with a carrier, the carrier having at least two clamping elements with a clamping end connected thereto, the clamping elements displaceable between a clamping position and a release position for the crank shaft the clamping elements clamping the crankshaft between their clamping ends and having connected thereto a drive unit for applying a required clamping force in the clamping position during rotation of the support member.

It is known to support crankshafts during the crank pin machining within the area between the two collets by a center drive support in order to increase the machining precision (German patent 31 01 924). During cutting of eccentric workpieces, especially of crank pins at crankshafts, only those crankpins positioned within the rotational center of the center drive support can be machined. If it is desired to machine all crank pins of a crankshaft with one clamping operation, the crankshaft must be rotated about the axis of the main bearings such that all crank pins are sequentially positioned at the rotational center of the center drive support in order to be machined. The center drive support prevents rattling during the machining of the crankshaft and low quality surfaces caused thereby, respectively, prevents low machining precision. In the known center drive support the clamping elements are radially displaceably supported at an annular carrier. For adjusting the clamping elements a hydraulic drive is provided at each clamping element. The individual hydraulic drives are connected to one another via lines and are commonly supplied with a hydraulic medium. For supplying the hydraulic drive with the hydraulic medium the lines open into an annular line of the carrier. The carrier itself is rotatably driven by a worm gear when the crankshaft clamped between the clamping elements is rotated during machining. The crankshaft is machined by circumferential cutting in which the cutting takes place at the feed velocity. The crankshaft is therefore rotated at a low speed. For a crankshaft diameter of, for example, 100 mm and a feed speed of 1 m/min the center drive support is rotated at 3.18 revolutions per minute. For such a low number of revolutions the transfer of the hydraulic medium from the stationary portion of the center drive support to the rotating portion for a diameter of approximately 500 mm is still controllable with respect to the sealing elements. The sealing elements in this case rotate at a speed of 5 m/min.

There are also rotating center drive supports known which have clamping systems operating by mechanically self-restraining transfer elements, for example, threaded spindles or wedge systems. By coupling and uncoupling the clamping drive during the standstill phase of the crankshaft the clamping systems are opened or closed. During the rotation of the center drive support no clamping control via the clamping drive is possible because the drive is uncoupled during the rotation of the center drive support.

From European publication 0 264 476 center drive supports are known in which the clamping force is not generated by a self-restraining clamping system, but by spring forces. The center drive support is provided with two pivotable two-armed levers which are pivoted into their respective clamping position by a spring. These clamping elements are arranged at the rotating center drive support such that the centrifugal force increases the supporting or clamping force. With these known center drive supports it is also not possible to control the clamping force via the clamping drive during the rotation of the center drive support because the clamping elements are only subjected to a spring force.

It is therefore an object of the present invention to provide a center drive support of the aforementioned kind with which at high rotational speeds of the workpiece to be machined the clamping force exerted by the clamping elements can be controlled and maintained in a constructively simple manner.

BRIEF DESCRIPTION OF THE DRAWINGS

This object, and other objects and advantages of the present invention will appear more clearly from the following specification in conjunction with the accompanying drawings in which.

SUMMARY OF THE INVENTION

Figure 1:
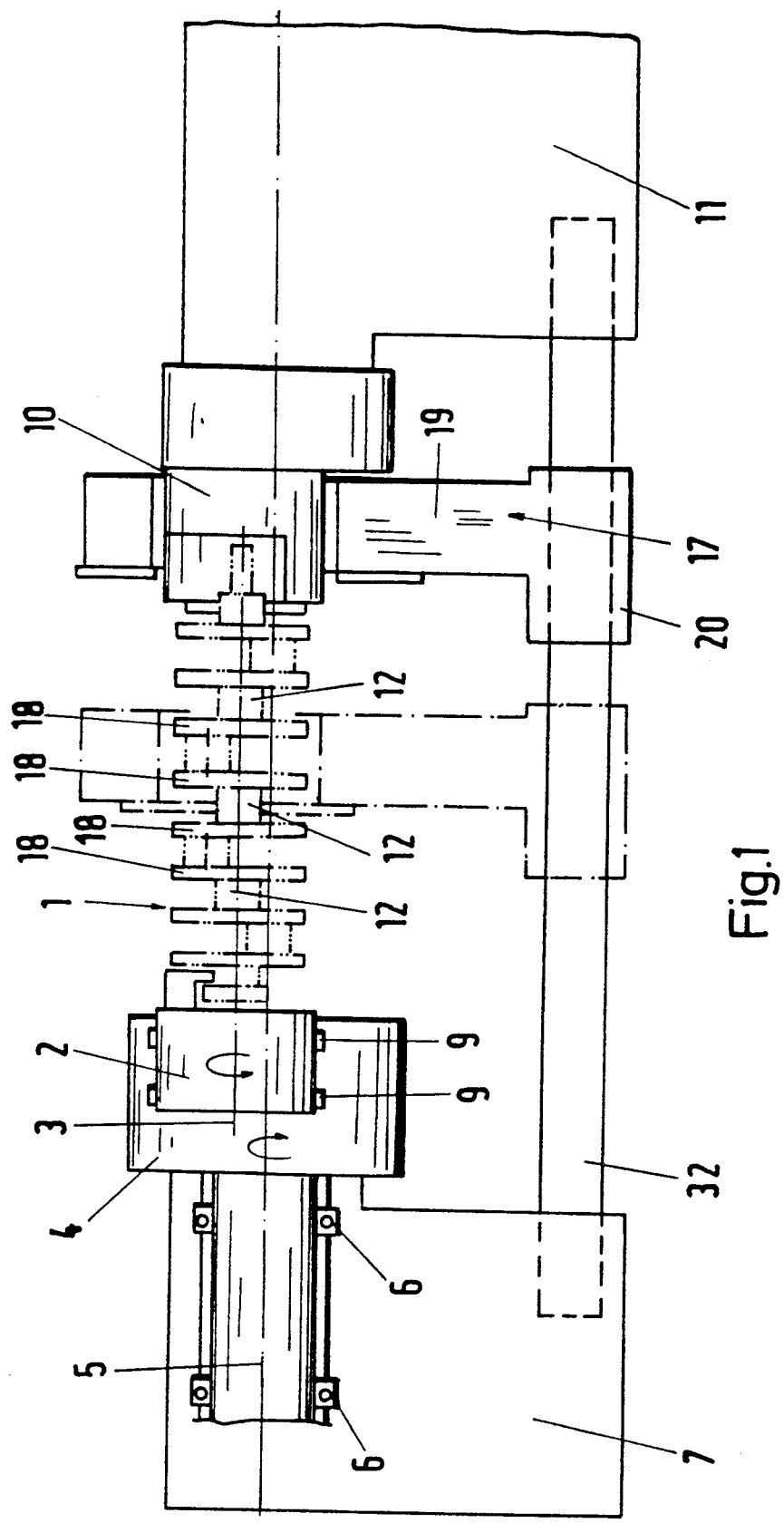
FIG. 1 is a side view of an inventive center drive support arranged between two headstocks.

The center drive support of the present invention is primarily characterized by a rotatably drivable support member with a carrier, the carrier having at least two clamping elements with a clamping end connected thereto, the clamping elements displaceable between a clamping position and a release position for the crankshaft, the clamping element clamping the crankshaft between the clamping ends; and a drive unit connected to the clamping elements for applying a required clamping force in the clamping position during rotation of the support member, the drive unit comprising: A clamping motor and a drive shaft connected to the clamping motor, a gear unit connected between the drive shaft and the carrier, the gear unit, during machining of the crankshaft in the clamping position, following the rotation of the support member against the torque of the clamping motor.

Preferably, the carrier is an eccentric disk rotatable relative to the support member. The carrier has guides and the clamping element each have a follower connected to the guides. Preferably, the guides are spiral-shaped.

In a further embodiment of the present invention the clamping elements are slides that are controllably displaceable between the clamping position and the release position.

Advantageously, the carrier has an outer toothing and the gear unit comprises an intermediate gear wheel supported at the support member and an inner ring drivingly connected with the clamping motor. The inner ring has an inner toothing. The intermediate gear wheel meshes with the outer toothing and with the inner toothing.

Expediently, the support member comprises a clamping disk, with the carrier rotatably supported at the clamping disk. Preferably, the clamping disk has a through opening.

In a preferred embodiment of the present invention, the support member is connected to a synchronizing shaft of the machining device comprising headstocks with collets. The synchronizing shaft is drivingly connected to the headstocks of the machining device such that the support member rotates synchronously with the collets of the headstock. The support member has a housing and the synchronizing shaft penetrates the housing.

Preferably, the carrier has an axis of rotation that coincides with the axis of the main bearing of the crankshaft to be machined. The support member preferably has an axis of rotation that coincides with the axis of the respective crank pin of the crankshaft to be machined.

In the inventive center drive support the clamping force is maintained in a controllable manner via mechanical means. The drive shaft of the clamping motor is rotated against the torque exerted by the clamping motor so that the clamping elements during the machining of the crankshaft are loaded in the clamping direction. Due to the mechanical embodiment, the inventive center drive support is suitable for high rotational speeds of the crankshaft to be machined. The carrier is rotated by the clamping motor via the gear unit so that the clamping elements are moved into their clamping position. When the support member is rotated during the machining of the crank shaft then the carrier, which is a component of the support member, is also accordingly rotated. Due to the clamping elements which hold the crankshaft the carrier follows the rotation of the support member. Accordingly, the drive shaft of the clamping motor is rotated against the torque exerted by the clamping motor. During the machining of the crankshaft the clamping force is thus controlled and, if desired, accordingly adjusted. In this manner, the clamping elements are constantly loaded by the clamping motor and the gear unit during rotation of the support member. It is thus ensured that the crankshaft during machining is reliably clamped and supported. It is furthermore prevented that the clamping force is reduced and a rattling of the crank shaft occurs.

DESCRIPTION OF PREFERRED EMBODIMENTS

The present invention will now be described in detail with the aid of several specific embodiments utilizing FIGS. 1 through 4.

Figure 2:
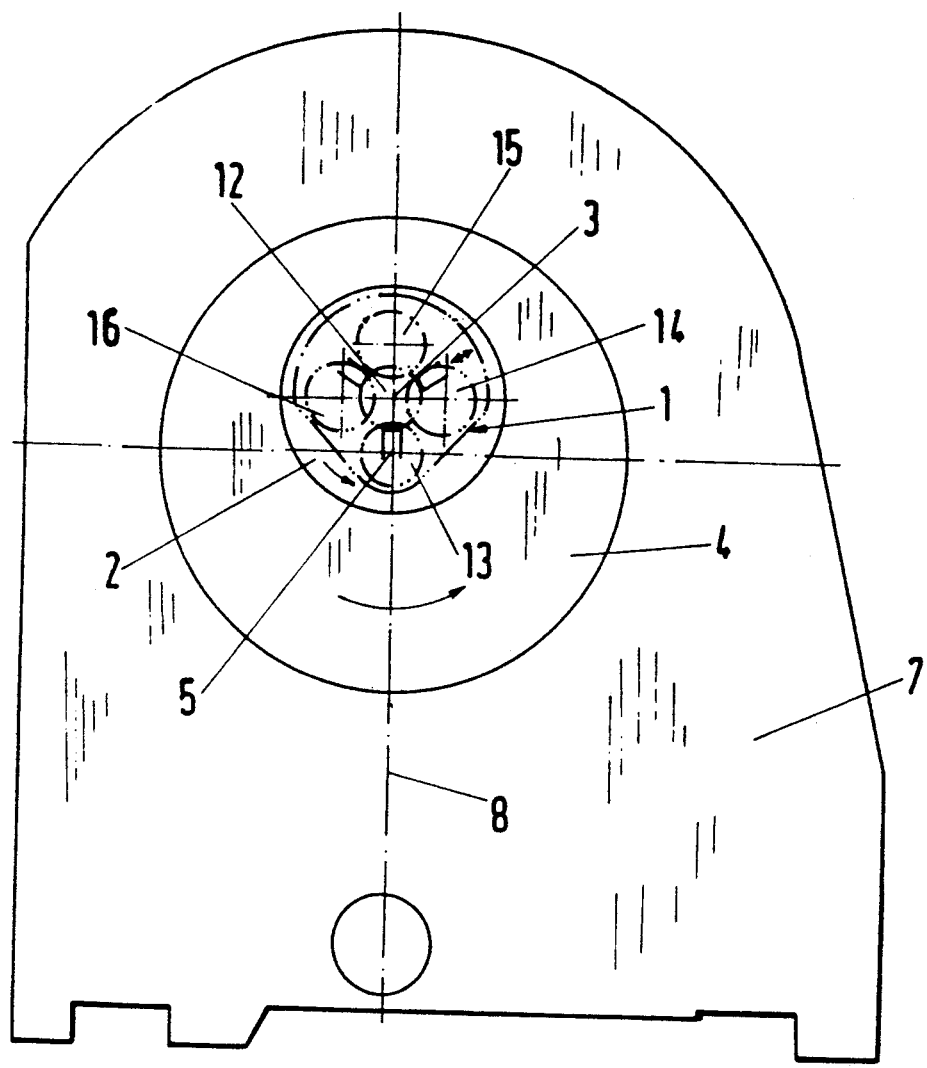
FIG. 2 is an enlarged representation of an end view of one head stock according to FIG. 1 with the crankshaft to be machined positioned therein.

As can be seen in FIG. 1, the crankshaft 1 to be machined is clamped with one end into a collet 2, which is rotatable about an axis 3. The collet 2 is rotatably supported within the chuck 4 which in turn is rotatable parallel to the axis 3 about an axis 5. The chuck 4 is rotatably supported by bearings 6 within a headstock 7. The two axis of rotation 3 and 5 are positioned in a common vertical plane 8 (FIG. 2). The collet 2 which is rotatably supported at bearings 9 within the chuck 4 is clamped and locked in a non-rotatable manner within the chuck 4 during machining of the crankshaft 1 and therefore rotates with the chuck 4.

The crankshaft 1 with its other end is clamped into an eccentric collet 10 of the headstock 11.

The crankshaft 1 in the shown embodiment is clamped such that the axis of the main bearings 12 are positioned within the axis of rotation 3 of the collet 2 (FIGS. 1 and 2). The crank pins 13–16 are staggered at an angle of 90° relative to one another when viewed in the axial direction of the crankshaft 1. The crank pin which is to be machined is positioned by adjusting the collet such that the axis of the respective crank pin is positioned within the axis of rotation 5 of the chuck 4 and collet 10. During machining of the crank pin 13 to 16 the crankshaft 1 is supported in the area between the two headstocks 7 and 11 by a rotating center drive support 17. The supporting position of the center drive support 17 is indicated in FIG. 1 with a dash-dotted line. In order to be able to machine all crank pins 13 to 16 with one clamping, the crankshaft 1 is rotated about the axis of the main bearings 12 such that all crank pins with their respective axis are suquentially positioned at the axis of rotation 5 and can be machined accordingly. Due to the support of the crankshaft 1 with the center drive support 17, a rattling of the crankshaft during machining is reliably prevented so that a high machining precision and a high cutting capacity is achieved.

The center drive support 17 rotates synchronously with the two chucks (collets) 4 and 10 and has the same eccentricity in the same plane. The support of the crankshaft 1 is achieved by centering jaws which clamp the crankshaft at the respective pre-finished main bearing 12. Therefore, no machined auxiliary surfaces are needed at the webs 18 of the crankshaft 1.

The center drive support 17 has a housing 19 with a base 20. The housing 19 has a through opening 21, the cross-sectional surface area of which is great enough to allow the center drive support 17 to be moved over the crankshaft. The through opening 21 is limited by a hub 22 of a gear wheel 23. The hub 22 is essentially formed by two rings 24 and 25 which are positioned on both end faces of the gear wheel 23 and which are fixedly connected to it. The ring 25 has a flange 26 extending radially outwardly with which it engages an annular recess 27 at the end face of the housing 19. The axis of rotation 28 of the gear wheel 23 constitutes the axis of the through opening 21 which penetrates the gear wheel 23. The ring 24 is rotatably supported at a bearing 29 of the housing 19.

The gear wheel 23 meshes with an intermediate gear 30 that in turn meshes with a pinion 31 of the synchronizing shaft 32. The intermediate gear 30 has a stub shaft 33 which is rotatably supported via a bearing 34 within the housing 19. The synchronizing shaft 32 which penetrates the base 20 of the housing 19 is rotatably supported at the base 20 by bearings 35. As is shown in FIG. 1, the synchronizing shaft 32 extends between the two headstocks 7 and 11 which drive the synchronizing shaft 32 in rotation.

A clamping disk 36 is fixedly connected to the ring 24 by an annular disk 39 whereby the annular disk 39 and the clamping disk 36 are both rotatably supported via the ring 24 on the bearing 29. The ring 24 the clamping disk 36, and the annular disk 39 form a support member. The clamping disk 36 has a circumferential flange-type rim 37 which extends in the direction toward the housing 19. The clamping disk 36 itself is essentially located within the area in front of the housing 19. The clamping disk 36 and the annular disk 39 have a through opening 38 which serves to receive the crankshaft 1 to be machined and which is eccentric relative to the circular clamping disk. The through opening 38 has a smaller cross-section than the through opening 21 of the housing 19. The clamping disk 36 is fixedly connected with its end face facing the housing 19 to the annular disk 39, such that a receiving space 40 for the eccentric disk 41 is provided between them. The eccentric disk 41 (the carrier) is circular (FIG. 3) and is eccentric relative to the clamping disk 36. The axis of rotation 42 of the eccentric disk (carrier) 41 is spaced at a distance to the axis of rotation 28 of the clamping disk 36. The eccentric disk (carrier) 41 is secured against axial displacement between the clamping disk 36 and the annular disk 39. The annular disk 39 has a radially inwardly extending flange-type rim 43 that rests at the clamping disk 36 and limits the through opening 38.

The eccentric disk (carrier) 41 has an outer toothing 44 which meshes with an intermediate gear wheel 45 connected to a stub shaft 46 supported within the clamping disk 36 and the annular disk 39. The intermediate gear wheel 45 engages an inner toothing 47 of an inner ring 48 which is rotatably supported by a bearing 49 (FIG. 4) at the rim 37 of the clamping disk 36. The inner ring 48 has an outer toothing 50 which meshes with a gear wheel 51 that is rotatably supported at the housing 19 and is positioned within the area between the clamping disk 36 and the housing 19. The gear wheel 51 meshes with a further gear wheel 52 that is fixedly connected to the drive shaft 53 of a clamping motor 54. The drive shaft 53 is rotatably supported within the base 20 of the housing 19. The clamping motor 54 is advantageously flanged to the end face of the base 20.

Figure 3:
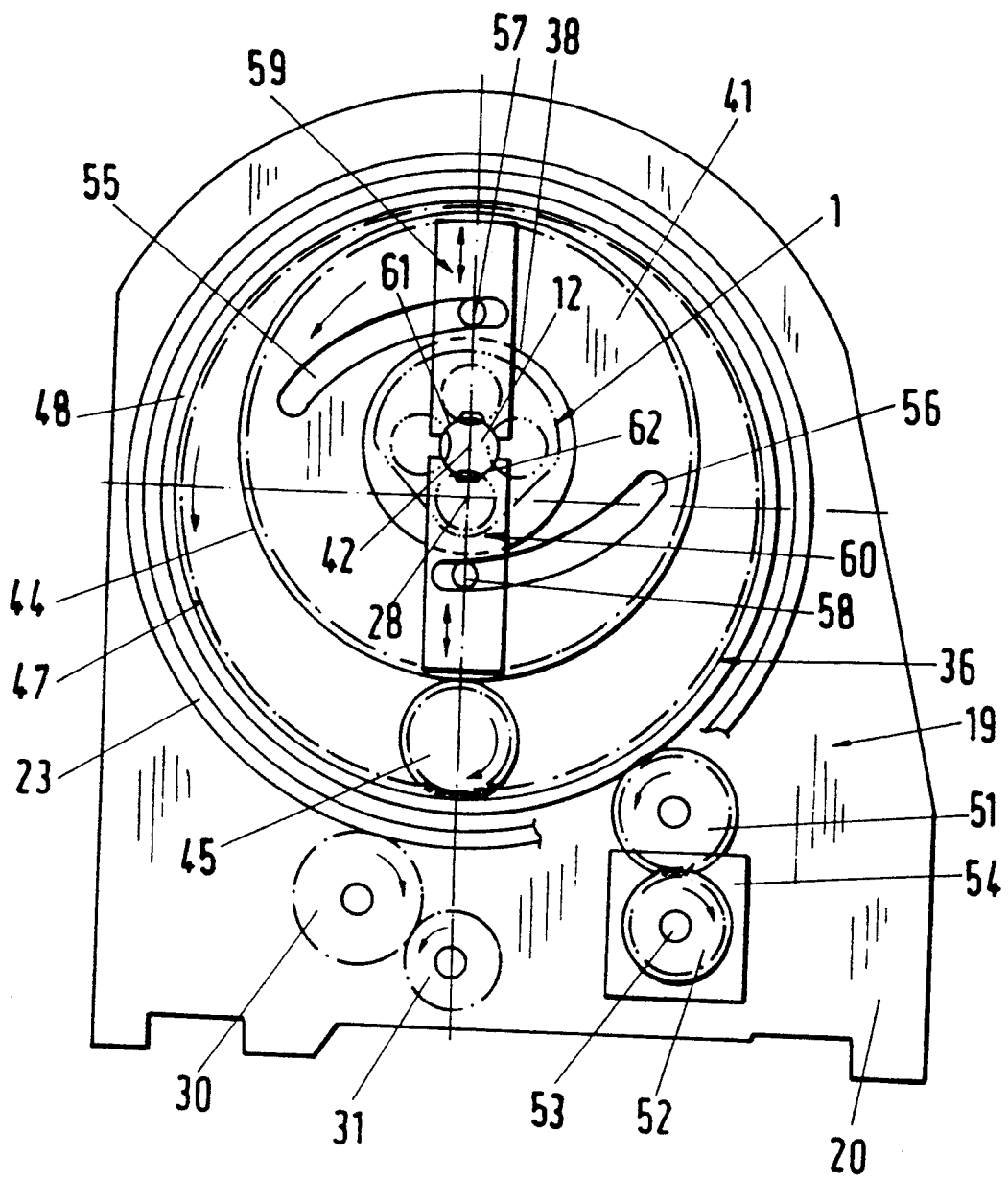
FIG. 3 is an enlarged schematical representation of an end view of a portion of the inventive center drive support.
Figure 4:
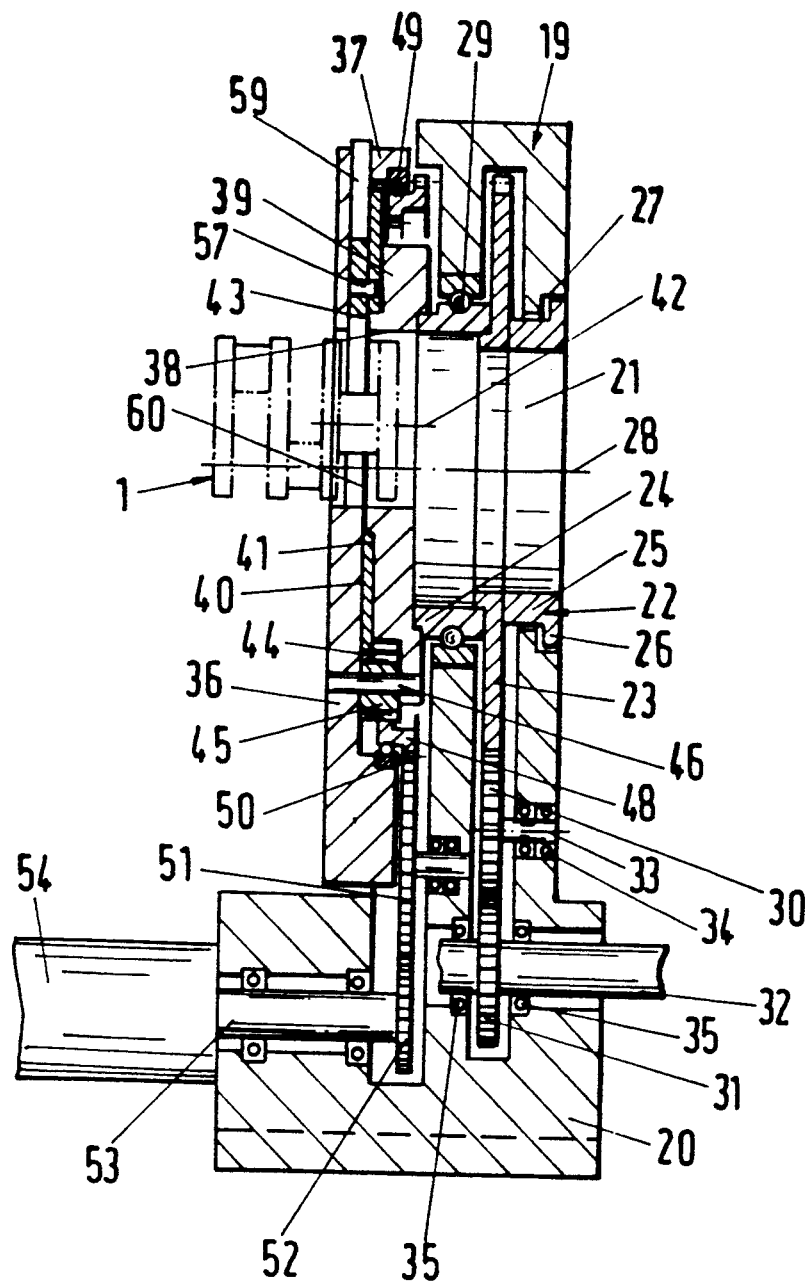
FIG. 4 is a side view in a schematic representation of a drive unit of the inventive center drive support.

The eccentric disk (carrier) 41, as can be seen in FIG. 3, has two arc-shaped guides in the form of guide slots 55 and 56 which are arranged diametrically opposite one another and which extend essentially spirally. When the eccentric disk (carrier) 41 is rotated in a counter-clockwise direction the guide slot 55, 56 extend from the inner end in an arc-shaped manner in an outward direction. Followers in the form of follower keys 57 and 58 of the respective slides 59 and 60 engage the guide slots 55 and 56. The slides 59, 60 are linearly displaceably supported at the clamping disk 36 and, as can be seen in FIG. 4, are axially secured between the clamping disk 36 and the eccentric disk (carrier) 41. The slides 59, 60 are embodied as clamping jaws having clamping ends facing one another and having essentially V-shaped recesses 61 and 62 (FIG. 3). The follower keys 57, 58 have a circular contour so that they are easily displaceable within the guide slots 55, 56. Due to the V-shaped recesses 61, 62 the slides 59, 60 are able to reliably clamp the crankshaft 1 at the main bearing 12.

For clamping and releasing the crankshaft 1 the clamping motor 54 is switched on so that via the drive shaft 53, the gear wheels 51, 52, the inner ring 48, and the intermediate gear wheel 45 the eccentric disk (carrier) 41 is rotated about its axis. Depending on the direction of rotation of the eccentric disk (carrier) 41, the slides 59, 60 are moved radially inwardly or radially outwardly due to the engagement of the follower keys 57, 58 in the guide slots 55, 56 of the eccentric disk 41. In the position represented in FIG. 3 the slides 59, 60 are radially inwardly displaced and clamp the crankshaft 1 at one of the main bearings 12. When in this position the eccentric disk (carrier) 41 is rotated about its axis 42 in the clockwise direction, the slides 59, 60 are displaced radially outwardly via the aforedescribed drive unit so that the clamping ends of the slides 59, 60 come to rest outside of the through opening 38 of the clamping disk 36.

Instead of two slides 59, 60, the center drive support 17 may also be provided with three or more slides whereby the eccentric disk (carrier) 41 is provided with a corresponding number of guides or guide slots 55, 56.

The gear wheel 23 and the inner ring 48 have a common axis 28.

When the center drive support 17 is positioned in its support position represented in dash-dotted lines in FIG. 1, the clamping disk 36 is rotated about its axis 28 which coincides with the axis of rotation 5. The drive is provided by the synchronizing shaft 32 so that it is ensured that the clamping disk 36 rotates synchronously with the crankshaft 1 which in a manner known per se is rotatably driven during machining. When the synchronizing shaft 32 is stopped, the clamping disk 36 is also no longer rotated about its axis. Now it is possible to rotate the eccentric disk (carrier) 41 with the aid of the clamping motor 54 and via the aforementioned drive unit 45, 48, 51, 52 in a clockwise direction (FIG. 3). The slides 59, 60 are radially outwardly displaced by the follower keys 57, 58 so that the crankshaft 1 is released. Since the slides 59, 60 are displaced so far radially outwardly that their clamping ends are outside of the through opening 38, the center drive support 17 can now be moved from its support position into the parking position (shown in solid lines in FIG. 1) past the left or the right chuck 4 or collet 10. After insertion of the crankshaft 1 to be machined into the collets the center drive support 17 is then moved from its parking position into the respective support position. By reversing the direction of rotation of the clamping motor 54 the slides 59, 60 are again closed by rotating the eccentric disk (carrier) 41 in a counter-clockwise direction, and the crankshaft 1 is clamped and supported at the main bearing 12.

After the clamping step the clamping motor 54 provides an adjustable torque so that the slides 59, 60 are constantly forced via the described drive unit and the eccentric disk (carrier) 41 into their clamping position. A rotational movement corresponding to the machining speed is now introduced into the clamping disk 36 via the synchronizing shaft 32 and the gears 31, 30, 23, and the clamping disk 36 is thus rotated counter-clockwise. The drive shaft 53 of the clamping motor 54 is accordingly rotated against the torque of the clamping motor 54 because, due to the slides 59, 60 holding the crankshaft 1, the center disk (carrier) 41 follows the rotational movement. Since the drive shaft 53 of the clamping motor 54 is rotated against the exerted torque, the clamping motor 54 acts as a brake whereby during the machining of the crankshaft 1 the clamping force is controllable and, if desired, can be adjusted. The slides 59, 60 are continuously loaded by the clamping motor 54 and the aforedescribed gear unit in the direction of clamping during the machining of the crankshaft 1 and thus during the rotation of the clamping disk 36 so that it is ensured that the crankshaft 1 during machining is reliably clamped and supported. Since the clamping motor 54 acts as a brake in the aforedescribed manner and thus as a generator, it is expedient to supply the resulting electrical power into the electrical supply network.

The clamping force which is exerted by the slides 59, 60 during the machining of the crankshaft can be influenced in the afordescribed manner by the clamping motor 54. The clamping motor/drive unit is not coupled and uncoupled, but remains in constant engagement during the machining of the crankshaft. The clamping motor 54 may be an electric motor or a hydraulic motor. With the inventive center drive support 17 a clamping control is ensured during the rotational movement of the crankshaft 1 during machining. Since the clamping force can be increased or reduced during the machining, if desired, by a corresponding adjustment of the torque of the clamping motor 54, a reliable control of the clamping forces is ensured.

The present invention is, of course, in no way restricted to the specific disclosure of the specification and drawings, but also encompasses any modifications within the scope of the appended claims.

What we claim is:

1. A center drive support for supporting a crankshaft during machining in a machining device; said center drive support comprising:
   a rotatably drivable support member, means for driving said support member in rotation, said support member being provided with a carrier, said carrier having at least two clamping elements with a clamping end connected thereto, said clamping elements displaceable between a clamping position and a release position for the crankshaft, said clamping elements clamping the crankshaft between said clamping ends; and
   a drive unit connected to said clamping elements for applying a required clamping force in said clamping position during rotation of said support member, said drive unit comprising:
   a clamping motor and a drive shaft connected to said clamping motor, a gear unit connected between said drive shaft and said carrier, said gear unit, during machining of the crankshaft in said clamping position, following the rotation of said support member against the torque of said clamping motor.

2. A center drive support according to claim 1, wherein said carrier is an eccentric disk rotatable relative to said support member.

3. A center drive support according to claim 1, wherein said carrier has guides and wherein said clamping elements each have a follower, said follower connected to said guides.

4. A center drive support according to claim 3, wherein said guides are slots.

5. A center drive support according to claim 3, wherein said guides are spiral-shaped.

6. A center drive support according to claim 1, wherein said clamping elements are slides that are controllably displaceable between said clamping position and said release position 7. A center drive support according to claim 1, wherein said carrier has an outer toothing and wherein said gear unit comprises an intermediate gear wheel supported at said support member and an inner ring drivingly connected with said clamping motor, said inner ring having an inner toothing, and said intermediate gear wheel meshing with said outer toothing and with said inner toothing.

8. A center drive support according to claim 1, wherein said support member comprises a clamping disk, with said carrier rotatably supported at said clamping disk.

9. A center drive support according to claim 8, wherein said clamping disk has a through opening.

10. A center drive support according to claim 1, wherein said support member driving means comprises a synchronizing shaft of the machining device, the machining device comprising headstocks with collets, said synchronizing shaft drivingly connected to the headstocks of the machining device such that said support member rotates synchronously with the collets of the headstocks.

11. A center drive support according to claim 10, wherein said support member has a housing and wherein said synchronizing shaft penetrates said housing of said support member.

12. A center drive support according to claim 1, wherein said carrier has an axis of rotation that coincides with the axis of the main bearing of the crankshaft to be machined.

13. A center drive support according to claim 1, wherein said support member has an axis of rotation that coincides with the axis of the respective crank pin of the crankshaft to be machined.

* * * * *